United States Patent [19]

Biro

[11] Patent Number: 4,785,522
[45] Date of Patent: Nov. 22, 1988

[54] METHOD OF MAKING A BAND SAW WHEEL

[75] Inventor: Vincent G. Biro, Lakeside, Ohio

[73] Assignee: Biro Manufacturing Company, Marblehead, Ohio

[21] Appl. No.: 94,158

[22] Filed: Sep. 4, 1987

[51] Int. Cl.⁴ .......................................... B22D 11/126
[52] U.S. Cl. ..................................... 29/527.6; 164/99; 164/103
[58] Field of Search ................................ 164/98–103; 29/527.6

[56] References Cited

U.S. PATENT DOCUMENTS

| | | |
|---|---|---|
| 1,864,517 | 6/1932 | Biro . |
| 2,081,033 | 5/1937 | Biro . |
| 2,218,781 | 10/1940 | Baggett ........................... 164/99 X |
| 2,851,069 | 9/1958 | Brown . |
| 2,884,026 | 4/1959 | Krenzke . |
| 2,963,054 | 12/1960 | Eschenburg . |
| 2,969,815 | 1/1961 | Lasar . |
| 3,208,487 | 9/1965 | Aja . |
| 4,172,402 | 10/1979 | Hayward ........................... 83/817 |
| 4,491,047 | 1/1985 | Butkiewiez et al. ................. 83/817 |

FOREIGN PATENT DOCUMENTS

| | | |
|---|---|---|
| 52-93626 | 8/1977 | Japan . |
| 54-28225 | 3/1979 | Japan . |
| 54-35827 | 3/1979 | Japan . |
| 118950 | of 1959 | U.S.S.R. . |

OTHER PUBLICATIONS

Casting of Aluminum Engine Pistons with a Cast Iron Ring, by Radzikhovskaya et al., in Vestn Khar' Kov Politekh. Int., No. 26, pp. 107–109, (1968), (in Russian).

Primary Examiner—Howard N. Goldberg
Assistant Examiner—Carl J. Arbes
Attorney, Agent, or Firm—Irvin L. Groh; Alfred L. Patmore, Jr.; Freeman Crampton

[57] ABSTRACT

A meat cutting pulley wheel is formed with an aluminum body and a cast iron ring bonded to the body rim. The method of manufacture includes machining the ring, preheating the ring and mold, inserting the ring into the mold, pouring molten aluminum into the mold, cooling in the mold and final machining of the ring.

15 Claims, 2 Drawing Sheets

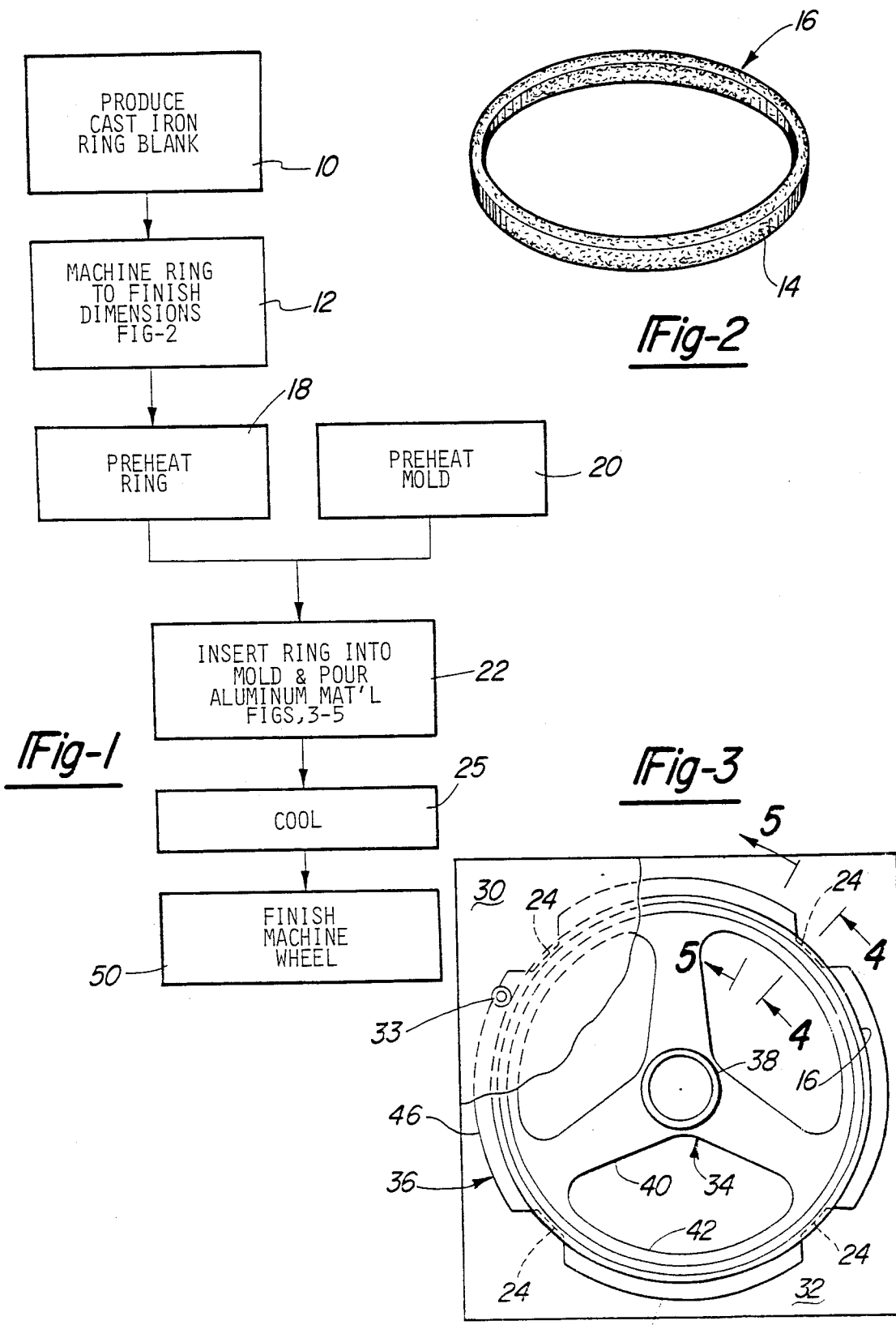

METHOD OF MAKING A BAND SAW WHEEL

BACKGROUND OF THE INVENTION

1. Field of the Invention

This invention relates to band saw wheels or pulleys for supporting and driving band saw blades and, more particularly, to a composite meat cutting band saw wheel.

2. Description of the Prior Art

Band saw pulley wheels have traditionally been made from cast iron, and this is particularly true in the meat cutting trade where special attention is directed to avoiding contamination of the meat being cut. Cast iron provides the proper frictional engaging surface for the band saw blade, and the material does not wear away in the form of iron dust or grime to adulterate the meat.

Early development of meat cutting band saws has involved the machining of the wheel surface to provide a proper taper to maintain the blade properly positioned under the considerable pressure exerted when sawing through meat and bone. Spiral or concentric grooves are provided in the wheel periphery which engage the band saw blade to maintain a frictional engaging surface even though the blade becomes covered with a slippery film of glutinous or oleaginous material produced in sawing through bone, marrow and fats of the meat. U.S. Pat. No. 2,081,033 to Carl G. Biro sets forth the design critera for the wheel configuration.

With increasing attention being directed to maintain proper sanitary conditions fostered by governmental agencies, the exposed saw surfaces are washed frequently, often with detergents or strong cleaners, which unfortunately promotes rusting of the cast iron wheels. This is particularly true in the supermarket environment. This in turn leads to an unsightly appearance of the wheel's surface with possibility of contamination of the meat. Substitute of other, non-rusting, materials for cast iron has not proved successful. For example, aluminum provides the desired clean wheel face appearance, but the working peripheral surface wears away with blade contact to produce a contaminating grime. Likewise, stainless steel provides the desired clean wheel face appearance, but does not provide a proper frictional surface for engagement of the band saw blade.

SUMMARY OF THE INVENTION

The present invention overcomes the foregoing prior art problems by providing a composite aluminum-cast iron structure. A composite aluminum-cast iron meat cutting band saw wheel is manufactured with an aluminum body including a hub, radial spokes and a rim, and a machined cast iron ring is bonded to the rim. Thus, the desirable non-rusting wheel face is achieved, but the desired frictional saw blade engaging periphery of the prior art is maintained.

The method of manufacturing the composite aluminum-cast iron meat cutting band saw wheel includes the following steps:

producing a cast iron ring either from a special casting or by cutting from a cast iron pipe;
machining at least the outer periphery of the ring to a predetermined dimension;
preheating the ring;
preheating a wheel mold;
inserting the ring within the mold in a predetermined position;
pouring molten aluminum into the mold;
cooling the composite aluminum-cast iron wheel formed in the mold while it is in the mold;
removing the composite wheel from the mold; and
machining the periphery of the composite wheel to final size with the cast iron ring being the exposed working surface for engaging a band saw blade.

The foregoing method produces a composite wheel which bonds the cast iron working surface ring to the aluminum body. This is accomplished by preheating the ring and the mold and pouring the aluminum at the proper temperature. It has been found that this bond is best produced when the mold is heated to a temperature between 750° and 850° F., the ring is preheated to a temperature between 900° and 1000° F. before inserting it into the mold, and the aluminum is poured into the mold at a temperature between 1350° and 1450° F. The composite wheel structure formed in the mold is cooled down for 2 to 3 minutes in the mold down to at least 900° F.

In order to properly position the cast iron ring in the mold as it is inserted therein, opposed positioning pads are built into the mold's surface. These pads engage the outer periphery of the ring, and preferably do so at four points which are spaced 90° apart. The ring must fit snuggly between the opposed pads for precise positioning. In one of the preferred embodiments, the ring is preheated to a temperature which produces this snug fit with the positioning pads. Preferably, this is in the range of between 900° and 1000° F.

DRAWING

The preferred embodiment of the invention are illustrated in the drawing in which:

FIG. 1 is a flow chart illustrating the method of producing the composite wheel according to the teachings of this invention;

FIG. 2 is a perspective view of the cast iron ring having at least its outer periphery machined prior to insertion into the mold;

FIG. 3 is a plan view of the mold with a major portion broken away to show the bottom half of the mold used to produce the wheel of this invention with the wheel as cast;

DETAILED DESCRIPTION OF PRESENTLY PREFERRED EMBODIMENTS OF THE INVENTION

The present invention overcomes the foregoing prior art problems by providing a composite aluminum-cast iron structure.

In order to produce the finished composite aluminum-cast iron wheel, it is necessary to preheat the mold and cast iron ring and to pour the aluminum at a high enough temperature to insure proper flow into the mold and uniform cooling of the aluminum body and cast iron ring. With the method of this invention, the aluminum body and ring are maintained at the same temperature so that the aluminum does not shrink away from the cast iron ring or the ring does not pull away from the aluminum body.

Another important criteria is proper positioning of the ring when it is inserted into the mold. Centering is necessary for proper balance of the finished product. Typically, the wheel can have an outside diameter of 16 inches with the outside diameter being machined to ±0.001″ to insure proper positioning between opposed positioning pads in the mold.

As shown in FIG. 1, the method of manufacturing the composite wheel starts with the first step of producing the cast iron ring blank as shown at 10. This is cast as an individual item, but in some instances it may be available from a length of cast iron pipe. The second step shown at 12 is to machine at least the outer periphery or outside diameter 14 of the ring 16 to a close tolerance as shown in FIG. 2.

Preferably the inside surface of the mold halves are coated with an aqueous solution of water glass and clay to act as a heat barrier promoting proper aluminum flow.

Figure 4:
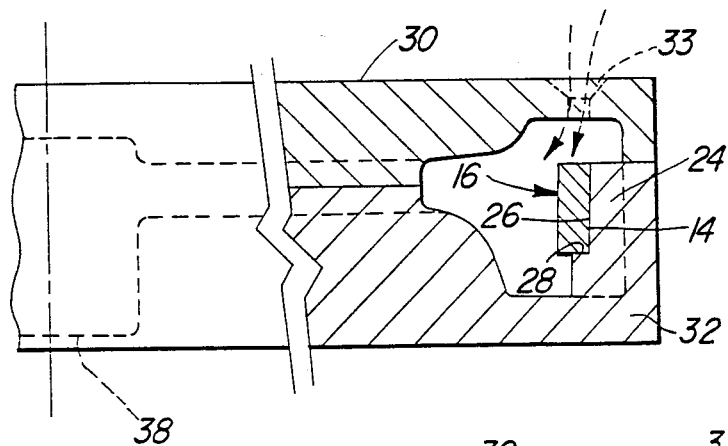
FIG. 4 is a fragmentary partial section view taken along line 4—4 of FIG. 3 showing the mold in its closed position with the cast iron ring having been inserted ready for receiving the molten aluminum.

The ring and the mold are both preheated as shown at 18 and 20 in FIG. 1. The mold is preheated to a temperature between 750° and 850° F. and ring 16 is heated to a temperature between 900° and 1000° F. and inserted into the mold as shown at 22 in FIG. 1. Ring 16 is inserted between opposed positioning pad portions 24 of bottom mold a half 32, one of which is shown in FIG. 4. Perferably, there are four positioning pad portions 24 located at 90° intervals as shown in FIG. 3. The outside diameter of periphery 14 of the ring 16 fits snuggly against the inside faces 26 of pad 24 when the rim has been heated to its preheat temperature. The ring sits on ledge portion 28 of the pad. If the outside diameter 14 of ring 16 is undersized, or if the surface 26 becomes larger due to wear, the ring can be heated to a higher temperature to obtain a snug fit. The ring should not be allowed to cool down below the mold temperature before the aluminum is poured.

Figure 5:
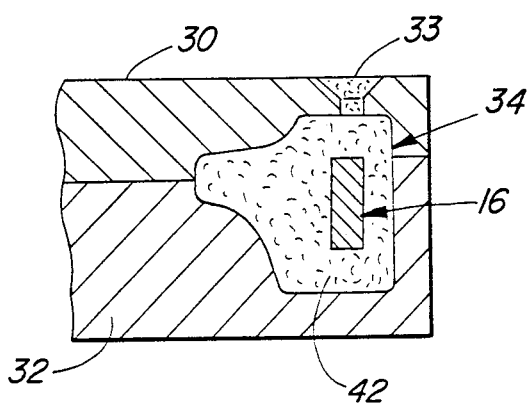
FIG. 5 is a fragmentary cross-sectional view along line 5—5 of FIG. 3 showing a portion of the rim as cast with the cast iron ring embedded in the aluminum.

After the ring 16 has been inserted in the bottom mold half 32, the upper mold half 30 is placed in position as shown in FIGS. 3–5. Molten aluminum is introduced into the mold at pour hold 33 at a temperature of approximately 1400° F. or within a range of between 1350° and 1450° F. As the aluminum cools down and solidifies as shown at 25 in FIG. 1, the temperature of the aluminum body and ring 16 remain equal to minimize any tendency for the cast iron ring to separate from the aluminum body due to the difference in coefficient of expansion of the two metals, so that a good bond is obtained between the cast iron ring and the aluminum body. To assure this uniform cooling, the composite wheel 36 is allowed to cool in the mold for a period of time between two or three minutes or down to a temperature of at least 900° F.

Figure 6:
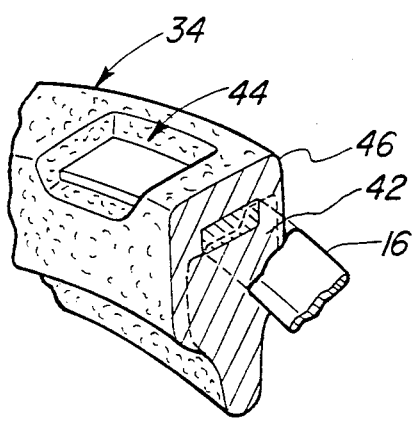
FIG. 6 is a fragmentary perspective view partially in section showing a portion of the wheel rim with the cast iron ring embedded therein at a point where the positioning pad contacts the cast iron ring.
Figure 7:
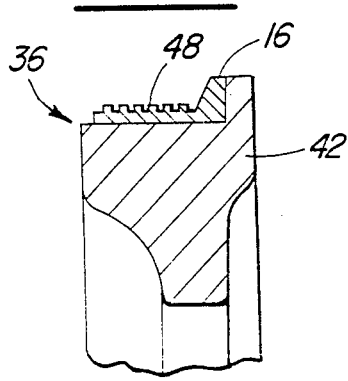
FIG. 7 is a framentary cross-sectional view of the composite aluminum-cast iron wheel with the excess peripherial aluminum having been removed and the cast iron ring machined to final dimension.
Figure 8:
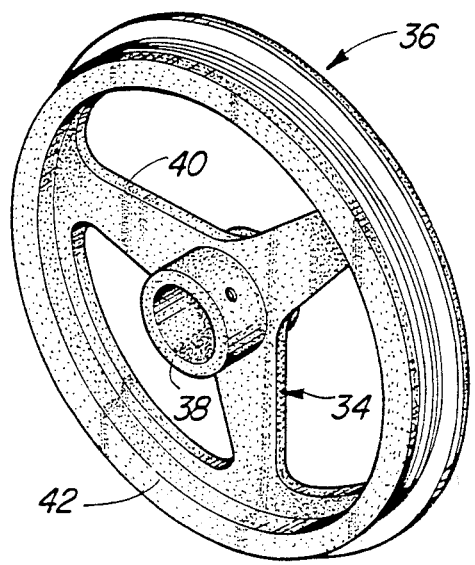
FIG. 8 is a perspective view of the finished composite aluminum-cast iron wheel of this invention.

The aluminum body 34 includes hub 38, spokes 40 and rim 42. FIGS. 5 and 6 show that the ring 16 is completely embedded in the aluminum rim 42 except for the portions 44 where the ring was held by positioning pads 24. When the ring has been removed from the mold and completely cooled, it is finish machined as shown at 50 in FIG. 1. The excess aluminum is removed at 46 and the final contour including concentric or spiral grooves 48 are machined into the surface of cast iron ring 16.

Alcoa aluminum alloy 319 is suitable for casting the composite wheel, having a nominal silicon content of 6.3% and copper content of 3.5%. Alcoa alloy 356 is also suitable having a silicon content of 7.0% and a magnesium content of 0.3%.

The embodiments of the invention in which an exclusive property is claimed are defined as follows:

1. The method of manufacturing a composite aluminum-cast iron meat cutting band saw wheel, comprising the following steps:
    (a) producing a cast iron ring;
    (b) machining at least the periphery of said ring to a predetermined dimension;
    (c) preheating said ring;
    (d) preheating a wheel mold;
    (e) inserting said ring within the mold in a predetermined position;
    (f) pouring molten aluminum into said mold;
    (g) cooling the composite aluminum-cast iron wheel formed in the mold while it is in the mold;
    (h) removing the composite wheel from the mold;
    (i) machining the periphery of the composite wheel to final size with the cast iron ring being the exposed working surface for engaging a band saw blade.

2. The method according to claim 1 wherein in step (d) the mold is heated to a temperature between 750° and 850° F.

3. The method according to claim 1 wherein in step (f) the molten aluminum is poured into the mold at a temperature between 1350° and 1450° F.

4. The method according to claim 1 wherein in step (g) the composite wheel is allowed to cool down to at least 900° F. in the mold.

5. The method according to claim 1 wherein in step (c) the ring is preheated to a temperature between 900° and 1000° F.

6. The method according to claim 1 wherein in step (e) the ring is inserted in said mold between opposed positioning pads establishing said predetermined position.

7. The method according to claim 6 wherein in step (e) the ring is inserted in said mold within four positioning pads which engage the periphery of said ring at points which are 90° apart establishing said predetermined position.

8. The method according to claim 6 wherein in step (c) the ring is heated to a temperature so that as the ring is inserted in the mold in step (e), the periphery of the ring will be received between said opposed pads with a snug fit.

9. The method according to claim 1 wherein in step (g) the composite wheel is allowed to cool in the mold 2 or 3 minutes.

10. The method according to claim 1 wherein prior to step (d), the mold is sprayed with an aqueous mixture of water glass and clay.

11. The method of manufacturing a composite aluminum-cast iron meat cutting band saw wheel, comprising the following steps:
    (a) forming a cast iron ring;
    (b) machining at least the periphery of said ring to a predetermined dimension;
    (c) preheating said ring;

(d) preheating a wheel mold to a temperature between 750° and 850° F;
(e) inserting said ring within the mold in a predetermined position;
(f) pouring molten aluminum into said mold at a temperature between 1350° and 1450° F;
(g) cooling the composite aluminum-cast iron wheel formed in the mold to a temperature of at least 900° F. in the mold;
(h) removing the composite wheel from the molds;
(i) machining the periphery of the composite wheel to final size with the cast iron ring being the exposed working surface for engaging a band saw blade.

12. The method according to claim 11 wherein in step (c) the ring is preheated to a temperature between 900° and 1000° F.

13. The method according to claim 12 wherein in step (e) the ring is inserted in said mold between opposed positioning pads establishing said predetermined position and in step (d) the ring is heated to a temperature within the range of 900° and 1000° F. so that as the ring is inserted in the mold in step (e), the periphery of the ring will be received between said opposed pads with a snug fit.

14. The method according to claim 11 wherein in step (e), the ring is inserted in said mold between opposed positioning pads establishing said predetermined position.

15. The method according to claim 14 wherein in step (c) the ring is heated to a temperature so that as the ring is inserted in the mold in step (e), the periphery of the ring will be received between said opposed pads with a snug fit.

* * * * *